United States Patent [19]

Kolodzey et al.

[11] 4,422,340

[45] Dec. 27, 1983

[54] DIFFERENTIAL PRESSURE FLOWMETER FOR A GAS COOLED HIGH TEMPERATURE REACTOR BLOWER

[75] Inventors: Jurgen Kolodzey, Ketsch; Josef Schoening, Hambruecken; Hans-Georg Schwiers, Ketsch; Wilfried Stracke, Oftersheim, all of Fed. Rep. of Germany

[73] Assignee: Hochtemperatur-Reaktorbau GmbH, Cologne, Fed. Rep. of Germany

[21] Appl. No.: 289,089

[22] Filed: Jul. 31, 1981

[30] Foreign Application Priority Data

Aug. 19, 1980 [DE] Fed. Rep. of Germany ....... 3031215

[51] Int. Cl.³ .............................................. G01F 1/44
[52] U.S. Cl. .................................. 73/861.63; 376/246
[58] Field of Search ..................... 73/168, 198, 861.63; 376/246, 287, 390, 391

[56] References Cited

U.S. PATENT DOCUMENTS

| | | | |
|---|---|---|---|
| 2,164,000 | 6/1939 | Keller | 73/168 X |
| 2,172,095 | 9/1939 | White | 73/168 X |
| 2,970,474 | 2/1961 | Kendig | 73/168 X |
| 2,975,118 | 3/1961 | Tognoni | 376/391 |
| 3,249,508 | 5/1966 | Rachais | 376/393 X |
| 3,928,133 | 12/1975 | Schabert et al. | 376/287 |
| 3,930,943 | 1/1976 | Michel et al. | 376/287 |
| 4,235,672 | 11/1980 | Harand et al. | 376/287 X |
| 4,255,235 | 3/1981 | Dubourg | 376/246 |

Primary Examiner—Herbert Goldstein
Attorney, Agent, or Firm—Schwartz, Jeffery, Schwaab, Mack, Blumenthal & Koch

[57] ABSTRACT

An apparatus for measuring the flow of gas in a blower of a gas cooled high temperature nuclear reactor comprising a blower, a blower shield communicating with the blower, an inlet conduit in the blower shield for conducting gas flow to the blower, an exit conduit in the blower shield for conducting gas flow from the blower and means for measuring the flow of gas in the exit conduit. The measuring means includes a venturi tube having a narrowed area in the exit conduit, a first measuring channel in communication with the gas flow in the narrowed area, a second measuring channel in communication with the gas flow in the exit conduit upstream from the narrowed area, and means for comparing the relative gas flow in the first and second measuring channels. A transducer connected to the first and second measuring channels performs the comparing and measuring steps.

2 Claims, 1 Drawing Figure

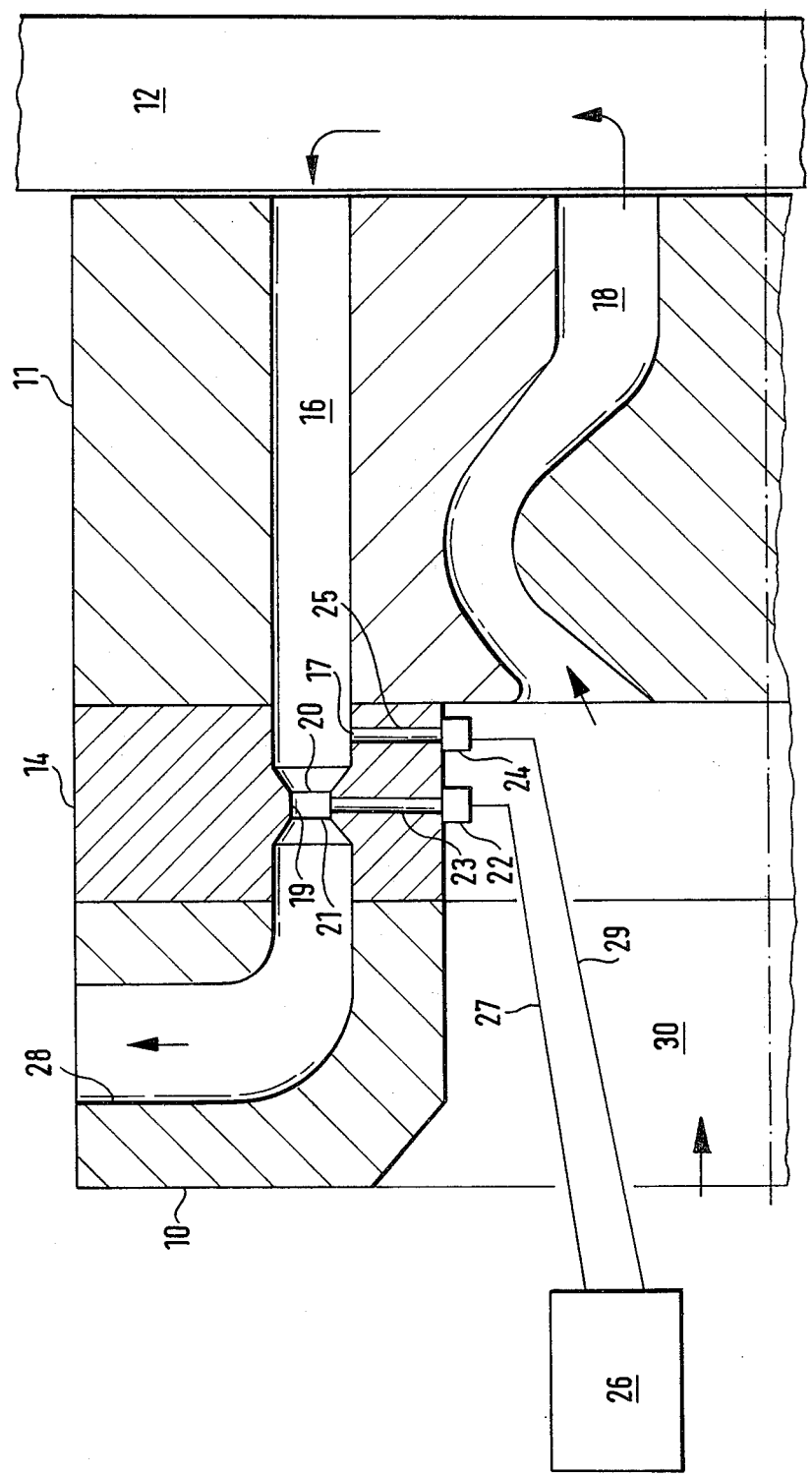

DIFFERENTIAL PRESSURE FLOWMETER FOR A GAS COOLED HIGH TEMPERATURE REACTOR BLOWER

BACKGROUND OF THE INVENTION

1. Field of the Invention

The invention concerns a device for measuring the gas flow through a blower. More particularly, the invention relates to measuring gas flow through the primary cooling gas blower of a gas cooled high temperature nuclear reactor.

2. Background of the Prior Art

The specification and determination of the output capacity of a blower is usually based on the technical capacity data of the blower, such as power intake, rpm, etc. In the case of the above-mentioned primary cooling gas blower, the capacity of the blower in combination with the gas temperature enables the determination of the capacity of the reactor core.

SUMMARY OF THE INVENTION

In a further development of these methods for the determination of capacities, it is an object of the invention to provide a device of the above-cited generic type whereby the output capacity of the blower determines the output capacity of the reactor core in combination with the gas temperature. The determination is performed independently of the technical data of the blower, such as current uptake or rpm.

This object is attained according to the invention by equipping the blower shield with a differential pressure flowmeter arranged in the flow channel.

Advantageously, the differential pressure flowmeter is arranged in the flow channel coming from the blower. The differential pressure flowmeter is formed by a narrowing of the flow channel in the shape of a venturi tube and a differential pressure flow measuring channel opening into the narrowing and a differential flow measuring channel opening into the flow channel before the narrowing when viewed in the direction of the flow. Both channels are in communication with a means for converting the flow rates into meaningful data. Such means includes a transducer.

BRIEF DESCRIPTION OF THE DRAWING

An embodiment of the invention is described hereinafter with reference to the drawing attached hereto. In the drawing:

a side cross sectional view of a flowmeter in a blower shield is illustrated.

DETAILED DESCRIPTION OF THE PREFERRED EMBODIMENT

In the single FIGURE of the drawing, the blower shield and the blower 12 connected with it are shown in a schematically simplified manner. The blower serves to cool a reactor core. The specific arrangement of blower and gas cooled high temperature reactor is disclosed in greater detail in U.S. Pat. No. 4,175,001, the disclosure of which is incorporated herein by reference. The blower shield comprises the intake and exhaust member 10, the intermediate member 14 and the connection member 11. Within these members, an intake channel 30 and 18, and an exhaust channel 16 and 28 cooperate with one another and the blower 12. The particular construction and design of the channels or conduits are described more particularly in copending U.S. Ser. No. 177,494 filed Aug. 12, 1980, the disclosure of which is incorporated herein by reference. The gas suctioned through the channels 30 and 18 into the blower 12 is being blown out by the latter through the channels 16 and 28 in a direction of flow indicated by the arrows. The flow channel 16 is provided with a narrowed area 19 in the form of a Venturi tube. The narrowed area is designed with a smaller diameter 20 at its inlet and at its outlet with a larger diameter 21. The intermediate piece 14 is equipped with a measuring channel 23 opening into the narrowing area 19 and a measuring channel 25 opening from the narrowed area at 17 to the exhaust channel 16. The measuring channels 23 and 25 are connected through the lines 27 and 29 with a transducer 26. The transducer is a conventional transducer well known and commercially available.

The pressures of the gas being transported, which are different at the measuring points because of the narrowed area 19, i.e., at the opening locations 19 and 17 of the measuring channels 23 and 25, are transmitted by the transducer 26. Form the difference in pressure at the measuring points 17, 19, and the temperature of the gas which is measured with conventional gas measuring devices with suitable calibration, the volume of gas transported by the blower and from this, the output of the reactor core to be cooled may be determined.

The specification and drawings set forth the preferred embodiments of the invention. It should be noted, however, that the invention is not limited to those specific embodiments and methods specifically disclosed, but extends to all embodiments, substitute and equivalent constructions falling within the scope of the invention as defined by the claims.

What is claimed is:

1. An apparatus for measuring the flow of gas in a blower of a gas cooled high temperature nuclear reactor comprising:
    a blower shield communicating with a blower;
    an inlet conduit in said blower shield for conducting gas flow to said blower;
    an exit conduit in said blower shield for conducting gas flow from said blower;
    a venturi tube in said exit conduit, a first measuring channel communicating with the gas flow in said venturi tube, a second measuring channel communicating with the gas flow in said exit conduit upstream from said venturi tube and means for converting the relative gas flow in said first and second measuring channels into meaningful reactor information.

2. The apparatus for measuring the flow of gas in a blower of claim 1 wherein said converting means is a transducer.

* * * * *